(12) United States Patent
Bonneau, Jr. et al.

(10) Patent No.: US 7,306,143 B2
(45) Date of Patent: Dec. 11, 2007

(54) DYNAMIC SMART CARD/MEDIA IMAGING

(75) Inventors: Walter C. Bonneau, Jr., Escondido, CA (US); David R. Carta, Poway, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 10/427,061

(22) Filed: Apr. 30, 2003

(65) Prior Publication Data

US 2004/0056087 A1 Mar. 25, 2004

Related U.S. Application Data

(60) Provisional application No. 60/412,452, filed on Sep. 20, 2002.

(51) Int. Cl.
*G06K 5/00* (2006.01)
*G06Q 30/00* (2006.01)
*G07G 1/14* (2006.01)

(52) U.S. Cl. .................. 235/380; 235/382; 705/14

(58) Field of Classification Search .............. 235/380, 235/375, 382, 382.5; 902/22, 25, 26, 39, 902/40; 705/13, 14, 16
See application file for complete search history.

(56) References Cited

U.S. PATENT DOCUMENTS

| | | | |
|---|---|---|---|
| 5,590,038 A * | 12/1996 | Pitroda ................. | 705/41 |
| 5,770,849 A | 6/1998 | Novis et al. | |
| 5,918,211 A * | 6/1999 | Sloane ................... | 705/16 |
| 6,068,183 A * | 5/2000 | Freeman et al. ........... | 235/375 |
| 6,450,407 B1 | 9/2002 | Freeman et al. | |
| 6,456,981 B1 | 9/2002 | Dejaeger et al. | |
| 6,505,773 B1 * | 1/2003 | Palmer et al. ............ | 235/380 |
| 6,571,279 B1 * | 5/2003 | Herz et al. ............... | 709/217 |
| 6,691,915 B1 * | 2/2004 | Thaxton et al. ........... | 235/380 |
| 7,003,495 B1 * | 2/2006 | Burger et al. ............. | 235/380 |
| 7,083,095 B2 * | 8/2006 | Hendrick ................. | 235/451 |
| 2001/0047272 A1 * | 11/2001 | Frietas et al. ............ | 705/1 |
| 2002/0017557 A1 * | 2/2002 | Hendrick ................. | 235/380 |
| 2002/0029165 A1 * | 3/2002 | Takatori et al. ........... | 705/13 |
| 2002/0082925 A1 | 6/2002 | Herwig | |

(Continued)

FOREIGN PATENT DOCUMENTS

EP 1143367 A2 10/2001

(Continued)

*Primary Examiner*—Jared J. Fureman
(74) *Attorney, Agent, or Firm*—Townsend and Townsend and Crew

(57) ABSTRACT

A smart electronic media dynamic imaging system and method to store and retrieve intelligent data tat may be used for displaying images, USCT alerts, or textual messages. The system is comprised of smart media, a reader, a vendor or electronic gate having display and a hosting computer that allows for the transfer and receiving of image data on to and from the smart media The method stores image data onto the smart media and locates images in a host computer such as that of the gate, vendor or store/station computer. In addition, a method of supplying personal data to a decision tree to determine what image data or file should be displayed is disclosed. The stored data held within the smart media, may contain personal data, usage information, and/or user profile tags (information) that can be used to decipher or data mine what data is to be activated or displayed.

47 Claims, 6 Drawing Sheets

U.S. PATENT DOCUMENTS

2002/0128903 A1*  9/2002  Kernahan .................... 705/14
2002/0165764 A1   11/2002  Wade et al.
2002/0174013 A1   11/2002  Freeman et al.
2003/0055726 A1    3/2003  Sohya et al.
2003/0106724 A1*  6/2003  Masamitsu et al. ...... 178/18.03
2003/0233276 A1* 12/2003  Pearlman et al. ............. 705/14

FOREIGN PATENT DOCUMENTS

| EP | 1 211 618 A1 | 6/2002 |
| WO | WO99/38117 | 7/1999 |
| WO | WO01/93070 A2 | 12/2001 |
| WO | WO/02/11022 A2 | 2/2002 |

* cited by examiner

| APPLICATION TYPES | | PRODUCTION MODE |
|---|---|---|
| DECIMAL | HEX | |
| 0 | 0 | TRANSPORT APPLICATION |
| 1 | 1 | FREE BLOCK APPLICATION IDENTIFIER |
| 2 | 2 | CARD OWNER |
| 3 | 3 | RESERVED FOR APPLICATION SUITE |
| 4 | 4 | RAS |
| 5 | 5 | RAS |
| 6 | 6 | RAS |
| 7 | 7 | RAS |
| 8 | 8 | |
| 9 | 9 | PERSONAL DATA RECORD |
| 10 | A | PERSONAL DATA RECORD |
| 200 | C8 | ACT 7 ACCESS CONTROL |
| 201 | C9 | ACT 7 ACCESS CONTROL |
| 202 | CA | OTHER IMAGE APPLICATONS |
| 203 | CB | OTHER IMAGE APPLICATONS |
| 204 | CC | OTHER IMAGE APPLICATONS |
| 205 | CD | OTHER IMAGE APPLICATIONS |
| 206 | CE | OTHER IMAGE APPLICATIONS |
| 207 | CF | OTHER IMAGE APPLICATIONS |
| 208 | D0 | OTHER IMAGE APPLICATIONS |
| 209 | D1 | |
| 210 | D2 | SECURITY PKI |
| 211 | D3 | SECURITY PKI |
| 212 | D4 | SECURITY PKI |
| 213 | D5 | SECURITY PKI |
| 214 | D6 | SECURITY PKI |
| 215 | D7 | SECURITY PKI |
| 216 | D8 | PHOTO IMAGE 2K/32K |
| 217 | D9 | PHOTO IMAGE 2K/32K |
| 218 | DA | PHOTO IMAGE 2K/32K |
| 219 | DB | PHOTO IMAGE 2K/32K |
| 220 | DC | PHOTO IMAGE 2K/32K |
| 221 | DD | PHOTO IMAGE 2K/32K |
| 222 | DE | PHOTO IMAGE 2K/32K |
| 223 | DF | PHOTO IMAGE 2K/32K |
| 224 | E0 | PHOTO IMAGE 2K/32K |
| 225 | E1 | PHOTO IMAGE 2K/32K |
| 226 | E2 | PHOTO IMAGE 2K/32K |
| 227 | E3 | PHOTO IMAGE 2K/32K |
| 228 | E4 | PHOTO IMAGE 2K/32K |
| 229 | E5 | |
| 230 | E6 | |

FIG. 2

DYNAMIC SMART CARD/MEDIA IMAGING

CROSS-REFERENCES TO RELATED APPLICATIONS

This application claims the benefit of priority of U.S. provisional application Ser. No. 60/412,452 filed Sep. 20, 2002 that is incorporated herein by reference in its entirety.

FIELD OF THE INVENTION

This invention relates generally to smart card use (both Contact and Contactless), such as in a transit or retail system, and more specifically to a system that provides for the dynamic loading of images, bit maps and icons to and from smart cards or other types of smart electronic media.

BACKGROUND OF THE INVENTION

Smart media, such as smart cards, are being used in an increasingly wide variety of applications. One such application is the use of smart cards to provide payment and ticketing capability for mass transit users. Smart cards have found applications in many other areas including pay phones, health care, banking, identity and access, pay television, gaming, metering and vending. Retail businesses utilize smart cards to encourage return business or to gain points that are redeemable for cash or merchandise.

Smart cards generally include one or more smart chips or integrated circuits ("IC") located within the body of the card or packaging to receive and store information or applications. The ICs can be read-only or have read/write capability. Reusable smart cards with read/write capability allow users to add time or value to payment-type smart cards, thus avoiding the inconvenience of having to carry currency, or, in the case of mass transit, exact change, for each usage. The smart card will also have an interface-mechanism, which will depend on whether the smart card is a contact-type or contactless smart card. Contactless cards will contain an antenna structure for communication with an RF source, and typically include circuitry adapted for deriving operating power from the RF signal.

The smart card is a small, usually credit card shaped, device that contains at least a memory device, typically an embedded integrated circuit, for storing information and applications and a transceiver to communicate with a smart card communication device. The smart card communicates through a transceiver on the smart card to access stored information. The smart card communication device may simply read the information, write information into the memory device or modify existing data in the memory device. For example, if the owner of a smart card uses a smart card containing financial information to make a purchase, the smart card communication device can read the information including the cardholder's identity and the availability of funds. The smart card communication device can also write a new volume to a smart card or deduct the purchase amount or token units from available funds. Further, the communication device can store transaction data on the smart card including the time and location of the transaction in addition to the identity of the communication device.

In the prior art, textual data, such as character and numerical data, is stored on smart media. Prior systems that utilize smart media do not have the ability to store a graphical image on the smart media with conditional data and display that graphical image to a display screen upon presentation to a card reader.

SUMMARY OF THE INVENTION

It is an advantage of the present invention to provide a system and method for loading graphical images, bit maps and icons to and from smart media such as smart cards (IC cards), optical memory cards and the like, including smart media contained within mobile computing devices.

It is another advantage to provide a system and method for encoding images during initialization of the card as well as after issuance onto an individual card.

It is a further advantage to obtain additional revenue from the use of smart media, such as fare media ticketing through the storage and dynamic reload of advertiser images held onto smart media or initiated from the smart media personalized data directed at a reader host application.

Smart media is used to store various types of images which can be qualified and/or quantified with personal information. This information is sent to a device, such as a fare gate vending machine or other validating equipment, which can make determinations and interpretations as to the image to extract from the card from an established database of images.

The image can be extracted and displayed from the smart media or smart card data file which is sent wirelessly to the device or card reader and processed for display on a display screen. The card-stored image can be modified based on a time expiration or can be reprogrammed manually. Further, the image can be processed on the card or in the hosting reader processor, i.e. host computer, to render a modified or personalized displayed image, i.e. a coffee drinker would have an associated flag bit that would select a coffee drinker's related advertisement as opposed to a tea drinker's advertisement. The system of the present invention is implemented with minimum administrative support by the owner/retailer or the transit authority staff.

The system and method of the present invention is not limited to fare or value media, such as smart cards, but any other type of media capable of storing data in the form of images. Furthermore, the system and method of the present invention will include:

1. Storage methods of storing images or image identifiers in a smart card's data memory.
2. A method to process personalized data and selected image data to generate a specific image output.
3. Methods of transferring data from card to reader to display.
4. A method to dynamically change the image or image identifier data on the card after issuance.
5. A method to encode image or image identifier data on the smart card.
6. Smart card personalized data or pointers that would initiate an image library or look up table.
7. Card holders filling out forms or questionnaires with personalized information and encoding the card holders' card based upon this information.
8. A method to decode image data from the card through the reader device.

The dynamic smart card imaging system and method of the present invention also includes the following features:

1. Multiple images can be loaded onto each card as directed by the advertiser or system owner.
2. Personalized advertising image exposure with personal record data.
3. Exposure and penetration of an image on a card can be accounted for including period of exposure, i.e. the number of times the image was displayed.

4. Images can be reloaded over and over again onto the media.
5. The media holder actually holds his own data/image so that the advertisement will follow them wherever they use the media.
6. New image loading is transparent to the card holder, i.e. the card holder does not know that new or additional images or advertisements were encoded onto his card.
7. Combined usage data with image instruction and personal record data can be used to decide what image(s) are loaded onto the card and for how long.
8. Addresses or location points, i.e. pointers, that can be placed in the card data memory to initiate an image that might be stored in the hosting computer or backend system.

The foregoing, together with other features and advantages of the present invention, will become more apparent when referring to the following specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 2 is a table illustrating the memory mapping of smart media;

DETAILED DESCRIPTION OF THE DRAWINGS

Figure 1:
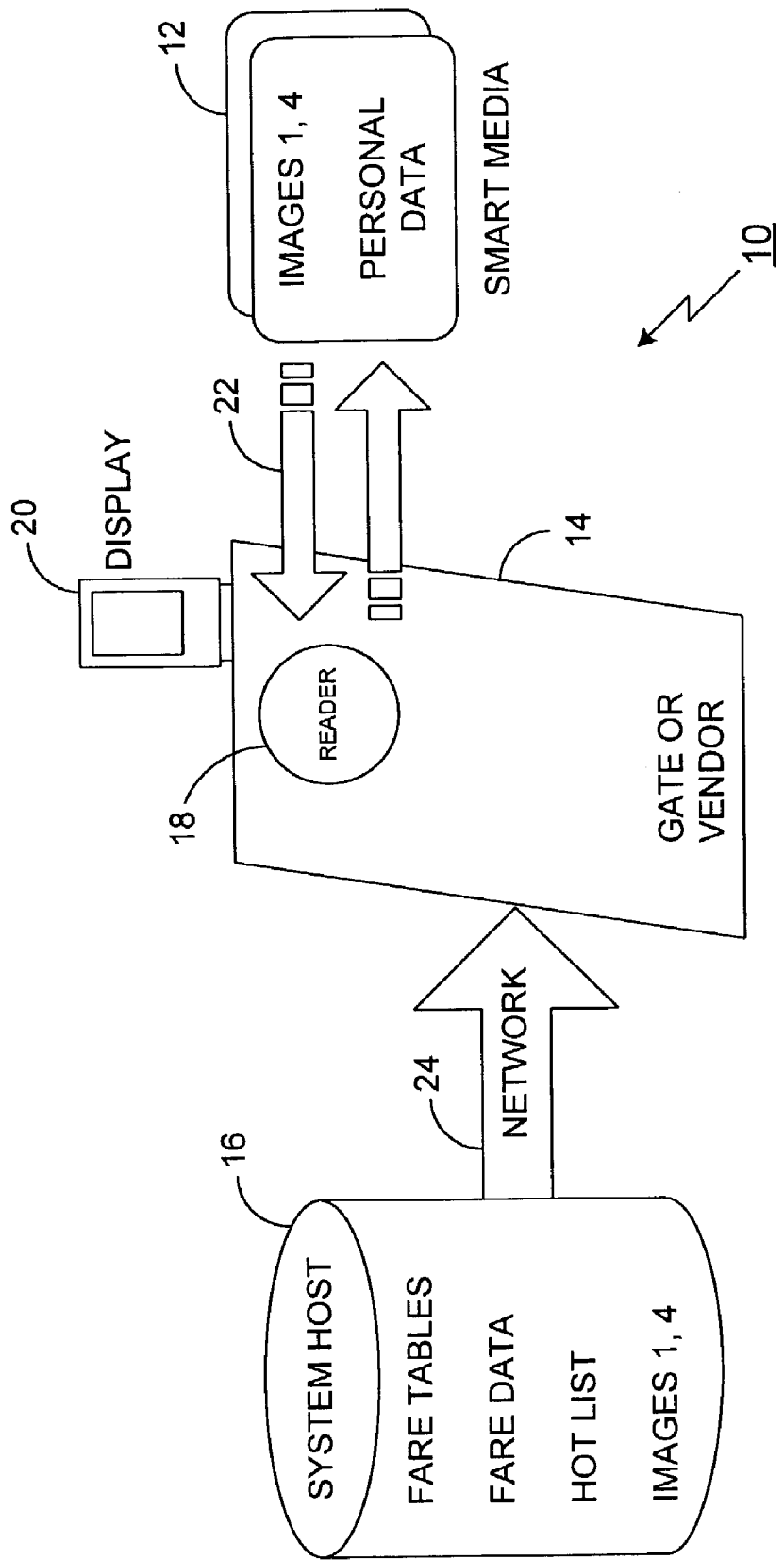
FIG. 1 is a flow chart illustrating the flow of image data of the dynamic smart card imaging system of the present invention.

FIG. 1 is a flow chart illustrating the flow of image data of the dynamic smart card imaging system 10 of the present invention. The dynamic smart card imaging system 10 is implemented as part of a mass transport or transit fare collection system in the preferred embodiment. Those skilled in the art will recognize that the principles and teachings described herein may be applied to a variety of applications or industries. Although a smart card is discussed, any type of smart electronic media can be utilized with the present invention, such as smart cards (IC cards), optical memory cards, personal digital assistants, mobile computing devices, mobile phones, MP3 players and the like.

The dynamic smart card imaging system 10 allows a graphical image, bit map, icon or the like to be downloaded or encoded onto smart media such as a transit smart card 12 by selecting an image stored from a set of images in the memory of end equipment 14, such as a gate, retail terminal, point of service terminal or vending machine. A transit smart card is a smart card utilized for a proximity electronic fare collection system for rapid transit or toll road application. A system host or host computer 16 stores the images, typically in the form of compressed data, for downloading to the gate 14 or to a point of service (POS) terminal such as on a bus.

The system host or host computer 16 contains a database of images. If the host computer is part of a transit system, the host computer may also contain fare tables, fare data and a hot list. A hot list is a list of smart media that is no longer valid. In the preferred embodiment, the images are in the form of advertisements such as for a soft drink or a particular brand of coffee. Each image is assigned a name such as AD1, AD2, AD3, AD4, etc or Image 1, Image 4 as is illustrated in FIG. 1. At predetermined intervals, such as every 30 days or the first of every month, the host computer 16 sends predetermined images or data that are selected in combination with patron or user personal data to the gate 14, via network 24, which are stored in a database or lookup table. For example, on the first of March, the host computer 16 could download AD1 and AD3, AD2 and AD4, or AD1, AD2 and AD3. A time keeper within the system determines when to download new images. The frequency and number of images downloaded to the gate 14 is determined by the owner of the system. Once it is determined that an image is to be loaded onto the card 12, an image is then downloaded or encoded onto a smart card from the gate by sending bi-directionally 22 to the smart card. Initially the smart card is encoded with an image AD0 and the image will be changed or swapped out at a time predetermined by the system. For example, the system could require that the initial image remain on the card for at least 30 days and a new image is to be loaded on the first day of the month following the initial 30 days of usage of the card. The card transactions may be a little slower at the time of encoding.

When a card holder presents his or her smart card 12 to a reader 18 located at the gate 14, the gate 14 reads the smart card 12 and displays the image currently stored on the card on a display screen 20 which is attached to the gate 14. However, if the time keeper indicates that the time limit for the image stored on the card has expired, the image is swapped out with another image that has been downloaded from the host computer 16 to the gate 14. To determine which image stored at the gate 14 should be downloaded onto the card, the system uses information or personal data about the card holder that is stored on the card. The smart card 12 transfers the data to the gate 14 and based upon this data, an image or advertisement is chosen from a lookup table in the gate 14 and encoded onto the card 12.

When a patron or card holder registers for a card, the vendor could require the card holder to fill out a form or questionnaire about his or her preferences with regard to various items such as beverage of preference, fast food of preference, automobile of preference or any other useful information. If it is known that the card holder is a coffee drinker, an image relating to coffee can be encoded or downloaded onto the card. The system can also keep track of the usage of the card by the card holder. For example, if a card holder consistently uses public transportation at 6 or 7 in the morning, there is a good likelihood that the card holder would be inclined to drink coffee in the morning. Furthermore, leaving that early in the morning, the card holder might not have had his or her cup of coffee. An image of an advertisement of coffee would remind the card holder to stop and get a cup of coffee.

In an additional embodiment, the card holder could be given an incentive to buy the advertised item appearing in the image. For example, if an ad for a soft drink appears, the card holder could receive a discount or coupon if he or she uses the card 12 to buy the soft drink. Vending machines could be set up outside the transit station which could accept payment with the smart card 12. By using the smart card 12 to buy the advertised product, a discount of 10%, or any other value determined by the advertiser or owner of the vending machine or store, could be deducted from the purchase price. Smart cards can be utilized for the purchasing of items other than fares by storage of a monetary amount/value. Each time the card holder purchases an item, such as a soft drink with the card 12, the purchase price of the item would then be automatically deducted from the monetary value of the card 12. Card holder's could increase the monetary value on the card 12 at vending machines, via the internet, or by telephoning the owner of the card, such as a transit authority.

If the time keeper in the host computer 16 indicates that it is time to swap out the image or data currently stored on the card 12, the personal data or profile of the card holder is sent to the gate 14 in encrypted form. Based upon this profile, the gate 14 determines which image currently being stored at the gate 14 should be encoded onto the card 12. The image is stored on the card 12 so every time the card holder presents his or her card 12 to a reader that is capable of displaying the image, the image will instantly appear on a display screen 20. In addition to the image, the system could be set up so that information relating to the fare is displayed. For example, the monetary value remaining on the card 12 or the number of bus or rail trips remaining on the card 12 can be displayed.

By the system swapping out a new image on the card 12 at predetermined intervals, the vendor can sell advertisement space on the card 12 that is valid for a specified period of time such as 7, 30 or 90 days. Once the predetermined interval has expired, the owner can sell that advertising space again. The system keeps track of which cards are encoded with which images and how many times the patron or card holder uses that card so that the image will be displayed. Therefore, the vendor can sell advertising space based upon the number of card holders and the number of times the card holder will use the card. The advertiser could be getting more exposure depending on if the card holder uses the card 12 more than normal for that person. The card holder is unaware that new images or advertisements are being encoded onto his card 12.

The image or advertisement is stored on the smart card in the form of image data. The image data can range anywhere from 0.25 Kbytes to 4.0 Kbytes to a memory size equal to that of the data memory located on the card. FIG. 2 illustrates a table of a mapping of the exampled memory usage for a 2 KB and 32 KB smart card data memory. Information or data is stored in memory blocks on the smart card. Data includes ownership information such as the card holder's name, application environment, image applications and security. The image data is compressed before encoding onto the card. Compression formats such as JPEG 2000 or the like can be utilized to compress the data. To ensure that the image is loaded in an efficient manner, the image data should be compressed at a ratio of at least >50:1.

The table of FIG. 2 is comprised of two columns, a production mode column and an application types column. Information or data stored on the card is indicated in the production mode column while the address in memory where the information or data is stored is indicated in the application types column. As indicated in the table, the address or location can be in decimal or hex. The following is a brief description of each type of data or information located in the production mode column:

TRANSPORT APPLICATION: data related to the type of system, including the transit purse, that the smart card is being used on, such as a metro or bus system.—Block 0

FREE BLOCK APPLICATION IDENTIFIER: Free data space.—Block 1

CARD HOLDER: The name of the card holder is identified.—Block 2

RESERVED FOR APPLICATION SUITE (RAS): Application data or Application coding/instructions depending on the smart card type being implemented such as Memory Logic or Microprocessor.—Blocks 3-7

PERSONAL DATA RECORD: Stores the personal data of the cardholder or personal identification flags. Information such as the cardholder's personal preference for coffee, fast food, cars, etc is stored here.—Blocks 9-10 (9-A)

ACT 7 ACCESS CONTROL: Physical access control data.—Blocks 200-201 (C8-C9)

OTHER IMAGE APPLICATIONS: Stores pointers or image identifiers to addresses in look up tables which store additional images. Additionally, Other Image Applications, store promotions or coupons that are being offered by advertisers.—Blocks 202-208 (CA-D0)

SECURITY PKI (Public Key Infrastructure): Stores security information, such as certificates, keys and access privileges, to prevent unauthorized people from using the card, such as information uniquely related to the cardholder.—Blocks 210-215 (D2-D7)

PHOTO IMAGE 2K/32K—Stores image data that is displayed on a display screen when the cardholder presents the smart card to the card reader. Each block contains a unique photo image. Typically advertisements are stored in each block. Although a photo image of 2K or 32K is indicated, a photo image of any size capable of fitting on the card can be utilized.—Blocks 216-228 (D8-E4)

Blocks 8, 209(D1) and 229-230 (E5-E6) are left blank. The owner of the card can utilize these blank memory blocks in the future to store information or data if needed.

To utilize the dynamic smart card imaging system, an image is selected and compressed using a compression algorithm. Once compressed, the image is encoded or loaded onto a smart card or other contact or contactless media. Once the image is loaded unto the card, the cardholder will present the card to a card reader on a device end equipment such as that of a transit gate, pump at a gas station, ATM, point of service terminal, retail terminal, vendor or any other device or location capable of reading a card and displaying the image data. As the card is presented, the image data file is transferred to the card reader's host processor that contains the decompression algorithm for the image. Compression engines such as JPEG 2000 or the like can be used. The image data is then decompressed and sent to the host computer such as a single board computer located in the end equipment for transfer to the display memory and then to the display screen.

In an alternative embodiment, the host computer contains a set of images containing images that correspond destinations or business located within close proximity to the end equipment. Close proximity is defined as less than ¼ mile, ½ mile, 1 mile or any other distance designated by the owner of the dynamic imaging system. When the profile of the cardholder is downloaded to the host computer, the host computer compares the profile to the set of images and using a predetermined set of instructions, determines which image to display. For instance, if the profile indicates that the cardholder is a coffee drinker and frequents fast food restaurants and there is a coffee shop and fast food restaurant located in close proximity to the end equipment, the host computer makes a decision as to which image to display. If the instructions contained on the host computer indicate that the coffee shop should take priority over the fast food restaurant, the image for the coffee shop will be displayed. The image to be displayed could be determined on a random basis.

If the image has not been previously encoded onto the card, the end equipment can capture the image to be loaded from sources such as the Internet or Intranet sent via a directed file. Typically the file is transmitted in a compressed format and loaded into a buffer for transmission to the next smart card or smart media presented to the gate. As a result, the smart card contains all the image data and when the smart card is presented at a reader, the card transfers the image to the display screen in conjunction with other application viewable data and non-viewable data. Viewable data can include data such as the monetary value of the card or the number of trips the cardholder has left for the transit system. Non-viewable data can include the name and address of the cardholder as well as the profile of the cardholder.

Stored on the smart card is a personal data record and usage data, i.e. profile of the cardholder. The personal data contains very specific data about the cardholder such as the cardholder's personal preference in food, travel, smoking, financial, housing, etc. When the card is presented to the reader on end equipment, such as a gate, the profile is transmitted to the host computer for processing. The host computer uses the profile to determine which image to encode onto the card. For example, if the profile indicates that the cardholder is a coffee drinker, an image or advertisement related to coffee will be downloaded and encoded onto the card. This could be considered a version of "Data Mining". In doing so, the combined information of personal data, time event, and previous travels or card use would be the source of the Data Mining or Decision Tree, i.e. the process the system uses to determine which image or advertisement should be encoded onto the card. For example, if the profile or personal data contained information that the cardholder last used the card at a fast food restaurant and that he might be a coffee drinker, a coffee advertiser might want their company logo or brief ad loaded unto the cardholder's card. Now that the cardholder is personally carrying the card with him for use at each end equipment reader, the advertisement will now be displayed onto the end equipment display until an event timer or application image time is expired.

Advertisers can purchase time on a card that is specific to a particular type of cardholder for a negotiated amount of time. In return the card issuer or system owner is able to gain advertising revenue from each transaction or for a period of time, such as 7, 30 or 90 days. This revenue can be used to pay for the operations of the system, a new source of revenue or for any other way determined by the owner. Since the smart card is reusable, the advertising space can be sold over and over again with only the need to electronically transfer new advertisement images to the end equipment for automatically loading onto the smart card. The system owner can easily account for all advertisers, smart cardholder penetration and the amount of time their advertisement was seen/displayed by the cardholder.

As described previously, several advertisement images could be sent to the end equipment for possible "Autoload" or encoding onto the smart card. One of these various images would be selected based upon the cardholder's profile and other advertiser's instructions for loading onto the specific smart card. The next cardholder interfacing with the reader might receive a completely different advertisement image from the pre-stored image bank focused upon his or her profile. If a profile is not available, a random or directed image would be loaded from the locally stored images on the equipment housing the reader.

Figure 3:
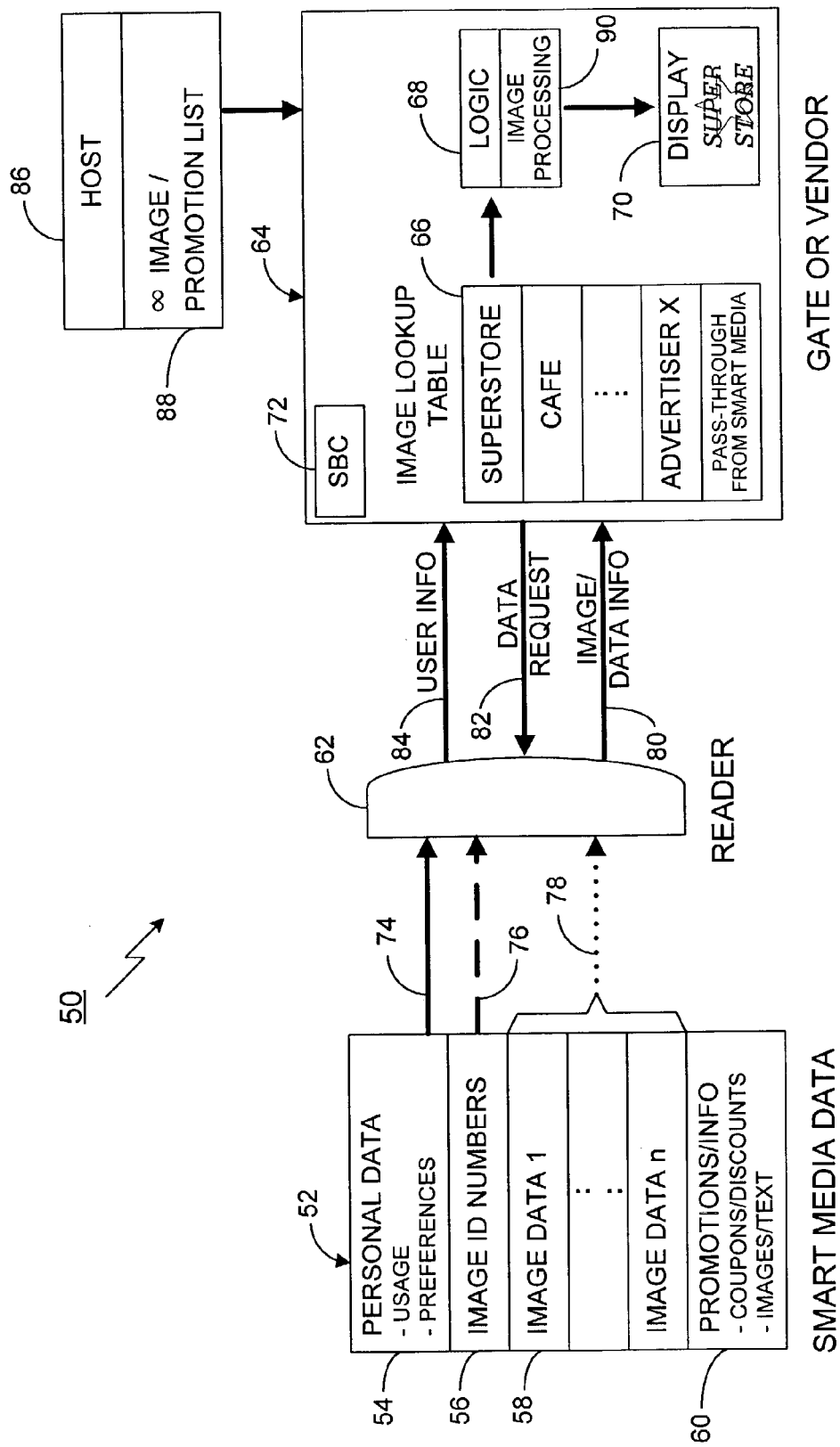
FIG. 3 is a flow diagram illustrating the flow of smart media data to a gate display.

FIG. 3 illustrates the flow of data from the smart card to end equipment such a gate, kiosk or vending machine 50. In the dynamic smart media/card imaging system of the present invention, as described previously, a smart card 52 is presented to a card reader 62 which can read and transfer data to and from the card 52. When the smart media holder or cardholder presents the card 52, personal data 54, such as the usage of the card 52 and the cardholder's preferences, a set of image data 58, containing the advertisements stored on the card 52, is transferred 74, 78 from the card to the card reader 62. The card reader 62 then sends user info 84 and image/data info 80 to the gate 64. This data is evaluated by the device (gate or vendor) which makes a decision and chooses an image in the image lookup table or set of available images 66 containing images or advertisements that is displayed.

Alternatively, image ID numbers or image identifiers 56 contain pointers to the advertisements can be utilized. The image identifiers can be transferred 76 to the gate 64 and used to look up the image in the image lookup table 66. Logic 68 is used to determine and/or decipher which image is to be displayed from the cards database of multiple images and icons and personal data flags. Located on the smart card is a file containing identification numbers that point to the set of available images. Using the profile an image identification number is selected from the file. The advertisement stored in the location directed to by a pointer or the image identification number, such as Superstore, Café or Advertiser X, is sent to the Single Board Computer (SBC) 72 which is the gate or vendor hosting logic board. The SBC 72 then relates the pointer to the image stored at that gate causing the image or advertisement to be sent to image processing 90 where the image is decompressed and sent to the display 70.

Furthermore, promotions/info, which contains coupons/discounts or images/text 60 is also stored on the smart card 52. To determine if the cardholder is eligible for a coupon, the data contained on the card is transferred to the gate, kiosk or vendor 64 and compared to a database of information or a database of information of available discounts which contain the available coupons or discounts. If that cardholder is eligible for a discount or coupon, the discount or coupon is transferred to the card. The next time the cardholder presents the card to a card reader, this information is passed onto the gate, kiosk or vendor 64. The SBC 72 then causes this information to be displayed on a display 70 for the cardholder/smart media holder to view. If the cardholder has a discount for a cup of coffee, the cardholder can go to the coffee house or restaurant indicated in the coupon and redeem the coupon. Upon redemption of the coupon, the coupon would be deleted from the card 52, as well as the cost of the beverage, minus the discount.

Additional or different images can be added to the image look up table 66. Originally, all images stored in the image lookup table 66 were captured from the host computer 86. The host computer 86 is comprised of an infinite image list 88, i.e. numerous images have the ability to reside on the host computer 86 and can be downloaded into the image lookup table located in the gate or vendor 64. Once the time for an advertiser has expired, the host computer 86 can download new images or advertisements into the image lookup table 66. Furthermore, if an advertiser has a new image or advertisement that they want to display, the new image can replace or swap out an old image. Additionally, the host computer can send new images or advertisements down based upon the type of card and the personal data of the cardholder. The gate or vendor 64 can request data 82 from the smart card, such as the preferences of the cardholder, so the gate can determine which image to load onto the card 52.

Figure 4:
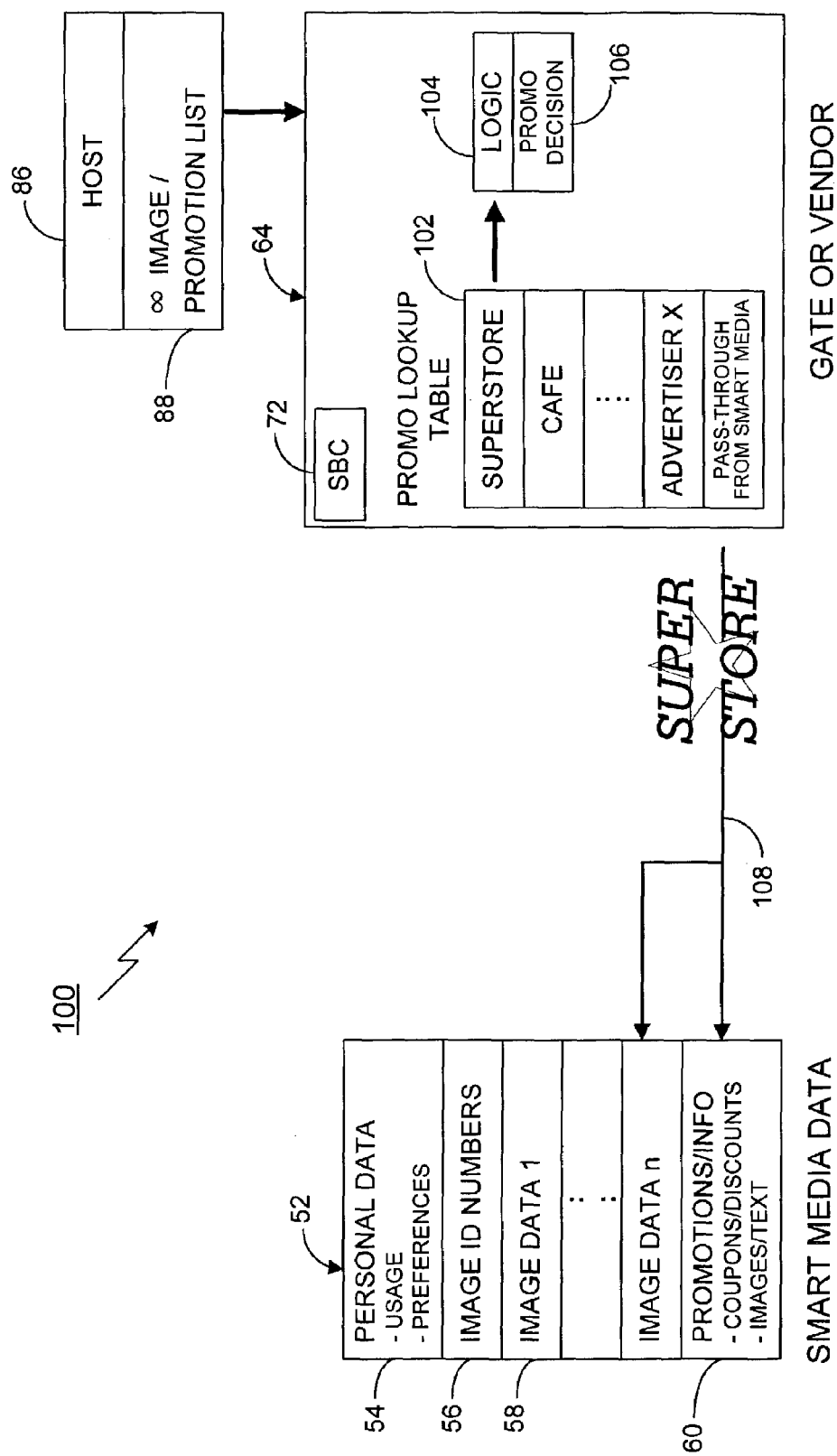
FIG. 4 is a flow diagram illustrating the flow of data from a gate to smart media.

FIG. 4 illustrates the flow of data from a gate or vendor 64 to a smart card 52. The gate or vendor 64 contains a series of images/promotions, which is downloaded by the host computer 86 in the form of a ∞ image/promotion list 88 into the SBC 72 and placed into the promo lookup table 102 as well as the promo store location, i.e. the address of the store. The ∞ image/promotion list 88 contains a series of images, promotions or advertisements. This information is fed to a reader which transfers the data (image, promotion or advertisement) to the memory blocks located on the smart card as illustrated in and described with references to FIGS. 2 and 3.

In addition, the card allows the image, promotion or advertisement to be stored onto some location on the card such as the image data 58, which means it can modify an image to create a new image for a coupon as well as promotional information such as getting a 10% discount on a product. For example, if the card contains an ad for a fast food restaurant, the ad could be changed into a coupon for the fast food restaurant. As described previously, the smart card 52 also contains personal data 54, such as the amount of usage of the card and the personal preferences of the cardholder, Image ID numbers or image identifiers 56 which point to images stored in the promo lookup table, such as Superstore, Café, Advertiser X as well as Pass-through from smart media and promotions/info 60 which contain coupons/discounts as well as the image/text of the coupons/images. Pass-through is promotional or instructive information that tells the accepting device to act upon the information being transferred from the smart card in a specific manner. Logic 104 and promo decision 106 decides what to do with the data, such as display the data, create a coupon from the data or show a new image. The promotion or image, such as Superstore, is uploaded 108 from the gate or vendor via an RF source as described previously or through a contact source.

Figure 5:
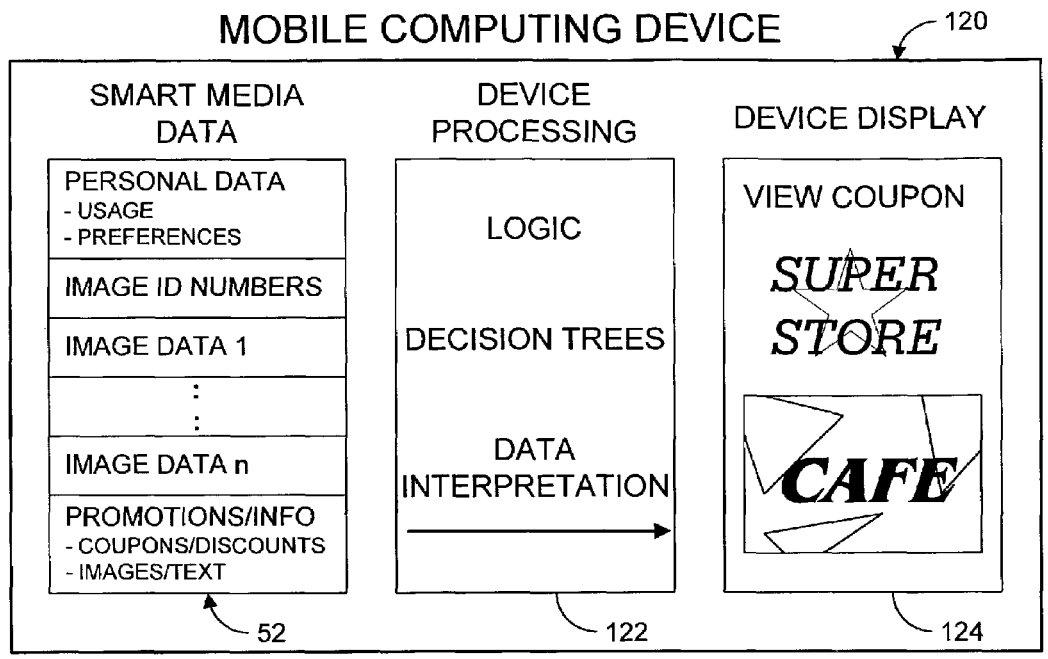
FIG. 5 illustrates the invention of the present invention utilizing a mobile computing device.

FIG. 5 illustrates the present invention utilizing a mobile computing device 120, such as a mobile phone. The mobile computing device 120 contains a smart card 52 and a display 124 which allows the cardholder or owner of the mobile computing device to view any coupons or promotions associated with his card. To view the coupons or promotions, the cardholder merely has to click on "view coupon" which appears on the display 124. The coupons indicate the amount of discount on a product that the cardholder is to receive. Multiple coupons can be stored on the mobile computing device, such as Superstore and CAFÉ as is illustrated in FIG. 5.

The smart media card 52 on the mobile computing device 124 contains data related to the cardholder as discussed previously with regard to FIGS. 2 and 3. When "view coupon" is chosen by the cardholder, the mobile computing device processes the information 122 using logic and decision trees, as described previously, to interpret the data to determine what if any coupons are available to the cardholder.

Figure 6:
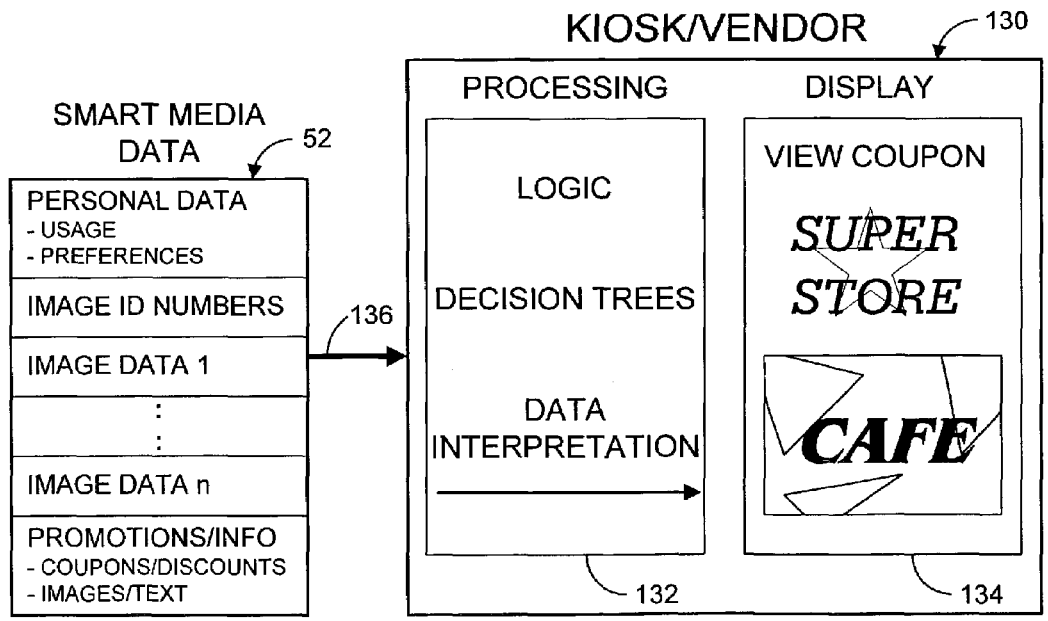
FIG. 6 illustrates the invention of the present invention utilizing a Kiosk or Vendor.

FIG. 6 illustrates the present invention utilizing a kiosk or vendor 130. A cardholder presents his smart card 52 to a card reader on the kiosk or vendor 130, such as a vending machine. It functions in the same way as FIG. 5, but the smart card 52 does not have the processing capability as the mobile computing device does. When the smart card 52 is presented to a card reader at the kiosk or vendor 130, data is transferred 136 to the kiosk or vendor 130. The data is then processed 132 using logic and decision trees, described previously, to interpret the data. If the cardholder has coupons or promotions available to him, the coupons or promotions are displayed on a display 134 of the kiosk or vendor 130, such as Superstore and CAFÉ as is illustrated in FIG. 6.

Figure 7:
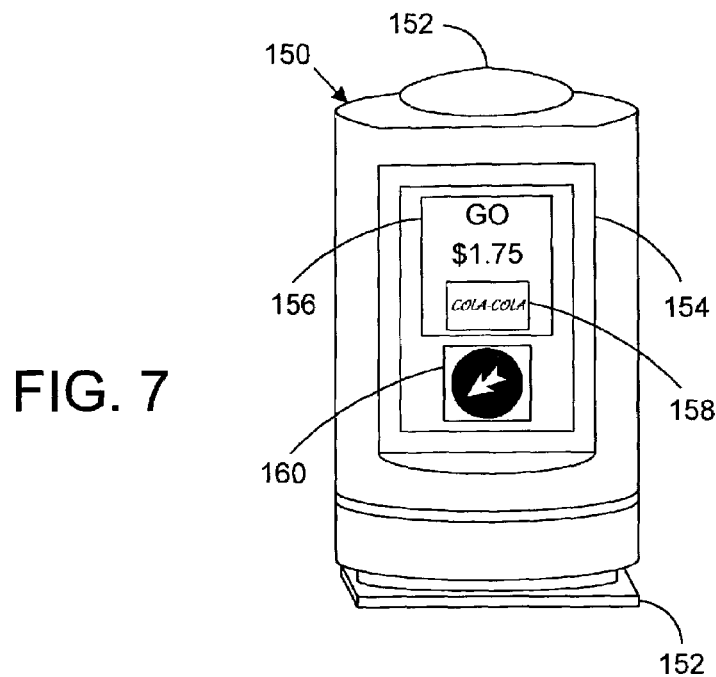
FIG. 7 is an illustration of a display module utilized in the present invention.

FIG. 7 is an illustration of a display module 150 that can be attached to a gate, or any other desired location, by platform 152. Attached to the top of the display module 150 is an indicator light 152 that lights up upon acceptance of the smart card, i.e. the smart card contains the correct monetary amount to allow the cardholder entrance to the transit system. The display module 150 is comprised of a display 154 containing a display graphic 156 which displays the image or advertisement 158 for the cardholder to view. Once the cardholder presents his card to a card reader, the image or advertisement 158 encoded on the card is displayed on the display screen for the cardholder to view as well as additional information about the card such as the monetary value ("$1.75 paid") or instructions ("See Customer Service Agent" or "Please Enter"). Arrow 160 tells the cardholder where to enter the transportation system.

Figure 8:
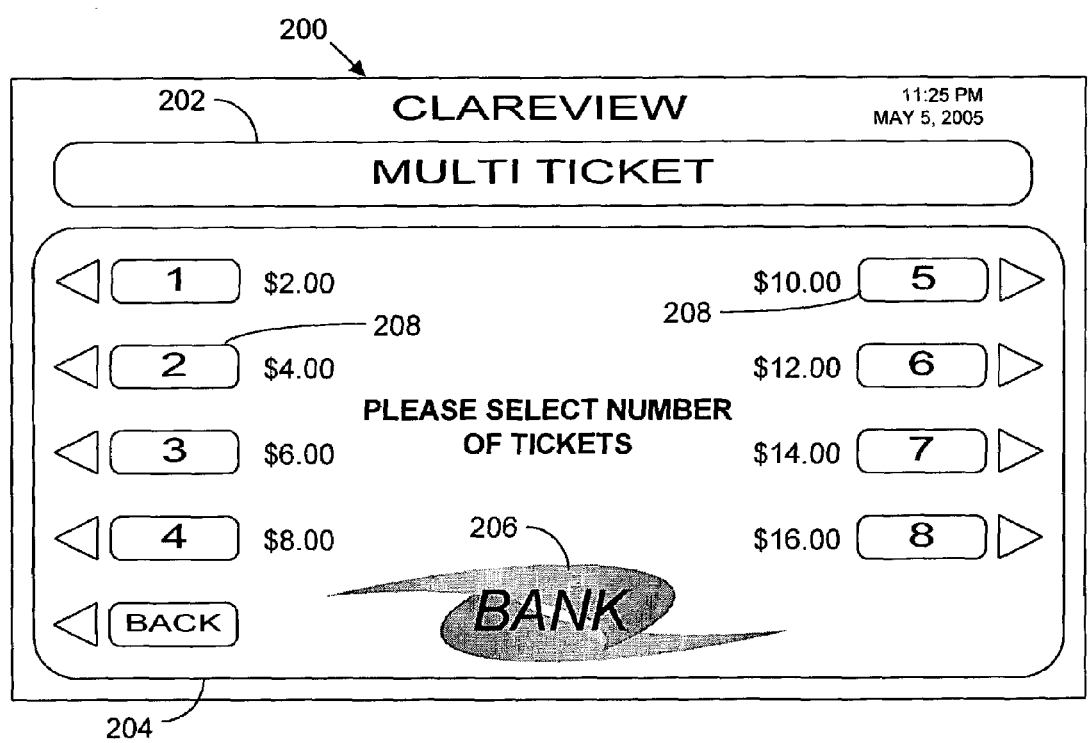
FIG. 8 is an illustration of a display screen in a transit vending machine which displays an image stored on a smart card.

FIG. 8 is an illustration of a display screen 200 typically located in a transit vending machine which displays an image stored on a smart card. In this example, the screen is from a vending machine located at the Clareview exit to a metro station and allows multi tickets 202, in the form of money, to be added onto smart cards. The cardholder can add money to his card, such as $1, $4, $6, $8, $10, $12, $14 or $16, by selecting the appropriate button 208 located within the fare module 204 of the display screen 200. When the cardholder presents his card to the vending machine to add tickets or additional money, an image or advertisement 206, such as BANK, stored on the card could be displayed on the display 154.

Although an exemplary embodiment of the invention has been described above by way of example only, it will be understood by those skilled in the field that modifications may be made to the disclosed embodiment without departing from the scope of the invention, which is defined by the appended claims.

The invention claimed is:

1. A method of displaying data utilizing information stored on smart media, the method comprising the steps of:
    downloading the data onto the smart media and storing the data in memory located on the smart media, the data comprising a set of images having at least one image;
    downloading a profile of a smart media holder onto the smart media, the profile containing personal data and usage data about the smart media holder;
    presenting the smart media to a card reader located on end equipment and downloading the profile of the smart media holder to the end equipment;
    comparing the profile to a set of destinations to determine which image in the set of images to display, each image in the set of images corresponding to a destination in the set of destinations, each destination in the set of destinations distinct from a location of the end equipment;

selecting an image from the set of images, the selected image corresponding to a destination in the set of destinations located in close proximity to the end equipment; and displaying the selected image on a display.

2. The method of claim 1, further comprising the step of:

downloading new data onto the smart media if a timekeeper for the data stored on the smart media has expired.

3. The method of claim 1, wherein the at least one image is selected from the group consisting of a graphical image, a bit map and an icon.

4. The method of claim 1, wherein the end equipment is selected from the group consisting of a gate, a vendor, a retail terminal and a point of service terminal.

5. The method of claim 1, wherein the set of destinations is located on the end equipment.

6. The method of claim 1, wherein the set of destination is located on a host computer connected to the end equipment.

7. The method of claim 1, wherein the smart media contains a monetary value in addition to the data.

8. The method of claim 1, wherein the personal data is selected from the group consisting of preference in food, preference in travel, preference in smoking and preference in housing.

9. The method of claim 1, wherein the data stored on the smart card is compressed.

10. The method of claim 9, further comprising the step of decompressing the data before displaying on the display.

11. The method of claim 1, wherein the smart media is selected from the group consisting of smart cards, optical memory cards, a personal digital assistant, a mobile computing device, a mobile phone and a MP3 Player.

12. A method of displaying data utilizing information stored on smart media, the method comprising the steps of:

storing a set of images in memory on end equipment, each image in the set of images is stored in a separate address in the memory;

downloading a profile of a smart media holder onto the smart media, the profile containing personal data and usage data about a smart media holder;

presenting the smart media to a card reader located on end equipment and downloading the profile of the smart media holder to the end equipment;

comparing the profile to a set of destinations to determine which image in the set of images to display, each image in the set of images corresponding to a destination in the set of destinations, each destination in the set of destinations distinct from a location of the end equipment;

selecting an image from the set of images, the selected image corresponding to a destination in the set of destinations located in close proximity to the end equipment;

directing the end equipment to locate the address in memory where the selected image is stored and to retrieve the selected image for display; and displaying the selected image on a display screen.

13. The method of claim 12, further comprising the step of:

downloading new data onto the smart media if a timekeeper for the data stored on the smart media has expired.

14. The method of claim 12, wherein the at least one image is selected from the group consisting of a graphical image, a bit map and an icon.

15. The method of claim 12, wherein the end equipment is selected from the group consisting of a gate, a vendor, a retail terminal and a point of service terminal.

16. The method of claim 12, wherein the smart media contains a monetary value in addition to the data.

17. The method of claim 12, wherein the personal data is selected from the group consisting of preference in food, preference in travel, preference in smoking and preference in housing.

18. The method of claim 12, wherein the data stored on the smart card is compressed.

19. The method of claim 18, further comprising the step of decompressing the data before displaying on the display.

20. The method of claim 12, wherein the smart media is selected from the group consisting of smart cards, optical memory cards, a personal digital assistant, a mobile computing device, a mobile phone and a MP3 Player.

21. A method of displaying data stored on smart media, the method comprising the steps of:

downloading the data onto the smart media, the smart media containing a display screen for displaying the data;

storing the data in memory located on the smart media, the data comprising a set of images having at least one image, each image in the set of images being replaced at a predetermined interval with an image representing a different product or service;

instructing the smart media to display a listing of available images on the display screen;

selecting an image from the list of available images in the set of images to display on the display screen, the image selected is determined by a smart media holder; and displaying the selected image on the display screen.

22. The method of claim 21, wherein the smart media is a mobile computing device.

23. The method of claim 22, wherein the image is associated with a button on a keypad, located on the mobile computing device, and the image is selected by pressing the button associated with the image.

24. The method of claim 22, wherein the display screen is a touch screen and each available image is associated with an icon and the image is selected by touching the icon on the touch screen associated with the image to be selected.

25. The method of claim 21, further comprising the step of loading the each image into the memory from the Internet.

26. The method of claim 21, further comprising the step of loading the each image into the memory from an Intranet.

27. A method of encoding data on smart media, the method comprising the steps of:

downloading a set of images to end equipment from a host computer, the set of images having at least one image and a corresponding predetermined interval for which the at least one image is valid;

presenting the smart media to a card reader located on the end equipment and downloading profile data of a cardholder from the smart media to the end equipment;

identifying images in the set of images that correspond to preferred products or services of the cardholder based upon the profile data;

selecting an image from the identified images according to a predetermined priority among the preferred products and services; and transferring the selected image to the smart media; and displaying the selected image on a display screen when the smart media is presented to any card reader.

28. The method of claim 27, wherein the image to be transferred is determined by the host computer.

29. The method of claim 27, wherein the frequency and the number of images to be downloaded onto the end equipment is determined by the host computer.

30. The method of claim 27, wherein the set of images is downloaded at intervals determined by the host computer.

31. The method of claim 27, wherein the host computer determines when the image stored on the smart media is to be swapped out for a different image.

32. The method of claim 27, wherein the profile data includes one or more of preference in food, preference in travel, preference in smoking and preference in housing.

33. The method of claim 27, wherein the selected image is a graphical image, a bit map, or an icon.

34. The method of claim 27, wherein the end equipment is selected from the group consisting of a gate, a vendor, and a point of service terminal.

35. The method of claim 27, wherein the smart media is selected from the group consisting of smart cards, optical memory cards, a personal digital assistant, a mobile computing device, a mobile phone and a MP3 player.

36. A method of encoding data on smart media, the method comprising the steps of:
storing a database of information about discounts available to a smart media holder on a device;
storing profile data on the smart media, the profile data comprising usage data and personal data of the smart media holder;
presenting the smart media to a card reader located on the device and downloading the profile data from the smart media to the device; and
retrieving discount information from the database based upon the profile data;
selecting a preferred discount from the discount information, the preferred discount being selected according to a predetermined priority among preferred products and services of the smart media holder using the profile data;
automatically downloading the preferred discount onto the smart media for immediate use by the smart media holder.

37. The method of claim 36, wherein the device is selected from the group consisting of a gate, a vendor, a retail terminal and a point of service terminal.

38. The method of claim 37, further comprising the step of:
presenting the smart media at a retail terminal for purchase of an item associated with the discount and automatically deducting the discount from a cost of the item and the cost of the item from the monetary value on the card.

39. The method of claim 38, wherein the retail terminal is located in a restaurant.

40. The method of claim 38, wherein the retail terminal is located in a vending machine.

41. The method of claim 36, wherein the smart media further comprises a monetary value.

42. The method of claim 36, wherein the smart media is selected from the group consisting of smart cards, optical media cards, a personal digital assistant, a mobile computing device, a mobile phone and a MP3 player.

43. A method of displaying data utilizing information stored on smart media, the method comprising the steps of:
storing a set of image identifiers on a device that point to a set of available images, the set of available images stored on the device;
storing a file on the smart media that contain identification numbers that point to the set of images;
presenting the smart media to a card reader located on the device and downloading the file to a device;
selecting an identification number from the file and pointing to an image in the set of available images to display; and
displaying the image on a display screen.

44. The method of claim 43, further comprising the steps of:
downloading a profile of a smart media holder onto the smart media, the profile containing personal data and usage data about the smart media holder;
downloading the profile of the smart media holder onto the device when the smart media is presented to the card reader; and
comparing the profile to the set of available images to select the identification number.

45. The method of claim 43, wherein the device is selected from the group consisting of a gate, a vendor, a retail terminal and a point of service terminal.

46. The method of claim 43, wherein the smart media is selected from the group consisting of smart cards, optical media cards, a personal digital assistant, a mobile computing device, a mobile phone and a MP3 player.

47. A method of displaying data utilizing information stored on smart media, the information including a profile of a smart media holder onto the smart media, the profile containing personal data and usage data about the smart media holder, the method comprising:
downloading the data from a fare collecting gate onto the smart media, the data comprising a set of images having at least one image;
receiving the smart media at a card reader located on the fare collecting gate and receiving the profile of the smart media holder at the fare collecting gate;
comparing the profile to a set of destinations to determine which image in the set of images to display, each image in the set of images corresponding to a destination in the set of destinations, at least one destination in the set of destinations distinct from a location of the fare collecting gate;
selecting an image from the set of images corresponding to a destination in the set of destinations; and
displaying the image on a display.

* * * * *